US010091791B2

(12) United States Patent
Jiang et al.

(10) Patent No.: US 10,091,791 B2
(45) Date of Patent: Oct. 2, 2018

(54) VEHICLE POSITIONING BY SIGNALING LINE-OF-SIGHT (LOS) VEHICLE INFORMATION

(71) Applicant: QUALCOMM Incorporated, San Diego, CA (US)

(72) Inventors: Libin Jiang, Bridgewater, NJ (US); Shailesh Patil, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/640,102

(22) Filed: Jun. 30, 2017

(65) Prior Publication Data
US 2018/0160419 A1 Jun. 7, 2018

Related U.S. Application Data

(60) Provisional application No. 62/429,603, filed on Dec. 2, 2016.

(51) Int. Cl.
*H04W 72/04* (2009.01)
*G01S 5/02* (2010.01)
*G01S 19/46* (2010.01)
*H04W 64/00* (2009.01)
*G01S 19/48* (2010.01)
*G01S 5/00* (2006.01)

(52) U.S. Cl.
CPC ......... *H04W 72/048* (2013.01); *G01S 5/0027* (2013.01); *G01S 5/0215* (2013.01); *G01S 5/0284* (2013.01); *G01S 19/46* (2013.01); *G01S 19/48* (2013.01); *H04W 64/006* (2013.01); *H04W 72/042* (2013.01)

(58) Field of Classification Search
CPC ...... G08G 1/166; G08G 1/0962; G09G 5/377; G06F 3/0482; G06F 3/04815; G06T 15/20; G06T 2207/20104
USPC ........................ 455/452.1; 340/903; 370/338
See application file for complete search history.

(56) References Cited

U.S. PATENT DOCUMENTS

| 8,229,663 | B2 | 7/2012 | Zeng et al. |
| 8,868,324 | B2 | 10/2014 | Haran |
| 9,214,086 | B1 | 12/2015 | Onishi |
| 2001/0055287 | A1 | 12/2001 | Sawada et al. |
| 2004/0230374 | A1 | 11/2004 | Tzamaloukas |
| 2007/0198140 | A1 | 8/2007 | Mudalige et al. |
| 2009/0279499 | A1 | 11/2009 | Machida |
| 2011/0238306 | A1 | 9/2011 | Miucic |

(Continued)

OTHER PUBLICATIONS

International Search Report and Written Opinion—PCT/US2017/061747—ISA/EPO—dated Mar. 6, 2018.

*Primary Examiner* — Phuoc H Doan
(74) *Attorney, Agent, or Firm* — Haynes and Boone, LLP

(57) ABSTRACT

Wireless communication systems and methods related to signaling line-of-sight (LOS) vehicle information for improving vehicle positioning accuracy are provided. A first vehicle receives, via a sensor, sensor data indicating a line-of-sight (LOS) vehicle. The first vehicle receives, via a wireless communication device, one or more ranging signals. The first vehicle determines that a first ranging signal of the one or more ranging signals is transmitted by the LOS vehicle. The first vehicle determines a position of the LOS vehicle based on at least the sensor data and the first ranging signal. Other aspects, embodiments, and features are also claimed and described.

30 Claims, 9 Drawing Sheets

(56) References Cited

U.S. PATENT DOCUMENTS

2012/0038489 A1  2/2012  Goldshmidt
2015/0228195 A1* 8/2015  Beaurepaire ......... G08G 1/0962
                                                340/907
2017/0016734 A1* 1/2017  Gupta ................ G01C 21/3697

* cited by examiner

VEHICLE POSITIONING BY SIGNALING LINE-OF-SIGHT (LOS) VEHICLE INFORMATION

CROSS REFERENCE TO RELATED APPLICATIONS

The present application claims priority to and the benefit of the U.S. Provisional Patent Application No. 62/429,603, filed Dec. 2, 2016, which is hereby incorporated by reference in its entirety as if fully set forth below and for all applicable purposes.

TECHNICAL FIELD

The technology discussed in this disclosure relates generally to vehicle positioning systems, and more particularly to improving vehicle positioning by signaling line-of-sight (LOS) vehicle information. Embodiments enable and provide solutions and techniques for vehicles equipped with global positioning system (GPS) devices, sensors, and/or wireless communication devices to improve vehicle positioning accuracy.

INTRODUCTION

Accurate vehicle positioning has potential applications in collision avoidance and autonomous driving. Vehicle positioning is typically based on global positioning systems (GPSs). For example, a vehicle may be equipped with a GPS device that receives GPS signals from GPS satellites and determines position, velocity, and time based on the GPS signals. Current GPS positioning has an accuracy of about 2 meters (m) to about 3 m. To support autonomous driving and/or collision avoidance, positioning accuracies may be required to be at least about 0.1 m to about 0.5 m. Accordingly, improved procedures for vehicle positioning may be desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes receiving, by a sensor of a first vehicle, sensor data indicating a line-of-sight (LOS) vehicle; receiving, by a wireless communication device of the first vehicle, one or more ranging signals; determining, by the first vehicle, that a first ranging signal of the one or more ranging signals is transmitted by the LOS vehicle; and determining, by the first vehicle, a position of the LOS vehicle based on at least the sensor data and the first ranging signal.

In an additional aspect of the disclosure, a method of wireless communication, includes receiving, by a base station from a first vehicle, line-of-sight (LOS) vehicle information associated with the first vehicle and a second vehicle positioned along a LOS communication path of the first vehicle; allocating, by the base station, resources to the first vehicle and the second vehicle based on the LOS vehicle information; and transmitting, by the base station, resource allocation information based on the allocating.

In an additional aspect of the disclosure, an apparatus associated with a first vehicle, includes a sensor configured to receive sensor data indicating a line-of-sight (LOS) vehicle; a wireless communication device configured to receive one or more ranging signals; and a processor configured to determine that a first ranging signal of the one or more ranging signals is transmitted by the LOS vehicle; and determine a position of the LOS vehicle based on at least the sensor data and the first ranging signal.

In an additional aspect of the disclosure, a wireless communication device, includes a receiver configured to receive, from a first vehicle, line-of-sight (LOS) vehicle information associated with the first vehicle and a second vehicle positioned along a LOS communication path of the first vehicle; a processor configured to allocate resources to the first vehicle and the second vehicle based on the LOS vehicle information; and a transmitter configured to transmit resource allocation information based on the allocated resources.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, such exemplary embodiments can be implemented in various devices, systems, and methods.

DETAILED DESCRIPTION

Figure 1:
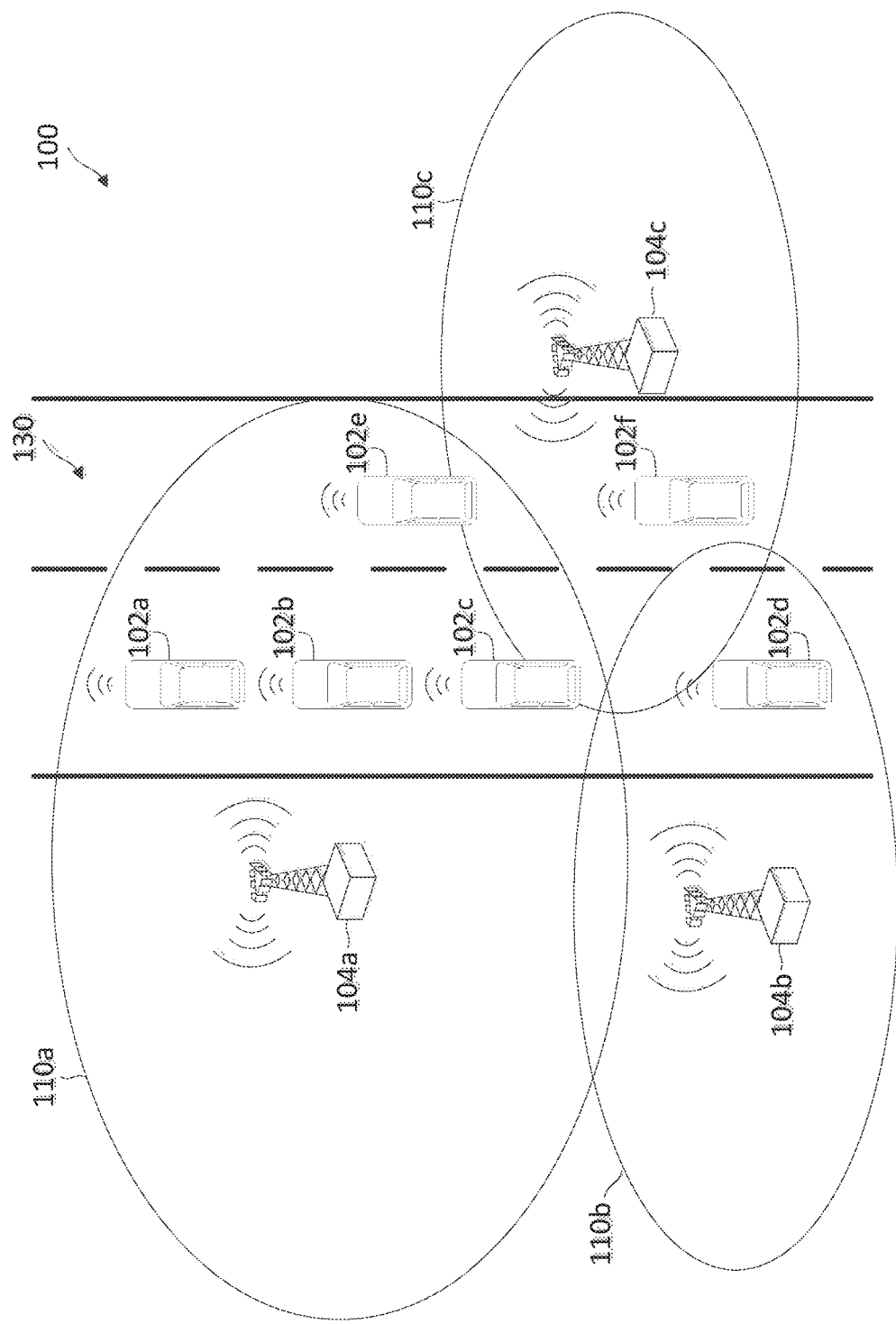
FIG. 1 illustrates a wireless communication network that facilitates vehicle-to-vehicle (V2V) communications according to embodiments of the present disclosure.

The detailed description set forth below, about the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details. In some instances, well-known structures and components are shown in block diagram form to avoid obscuring such concepts.

The techniques described herein may employ various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G)) network.

The present disclosure describes mechanisms for improving vehicle positioning accuracy by signaling LOS vehicle information. The disclosed embodiments employ LOS vehicle information to determine LOS ranging measurements and apply the LOS ranging measurements to refine vehicle positioning. For example, a first vehicle can include one or more sensors (e.g., a camera) that can detect the presence of a second vehicle that is along a LOS communication path of the vehicle. The first vehicle can determine a relative position of the second vehicle with respect to the first vehicle. The first vehicle can determine an absolute position of the second vehicle based on the relative position and GPS coordinate data of the first vehicle. The first vehicle can perform ranging with surrounding vehicles, which may include the second vehicle, other LOS vehicles, and non-line-of sight (NLOS) vehicles. The first vehicle can identify a ranging signal transmitted by a LOS vehicle (e.g., the second vehicle) and refine the absolute position of the LOS vehicle based on the ranging signal. In an embodiment, the first vehicle can broadcast the LOS vehicle information to surrounding vehicles to enable the surrounding vehicles to perform positioning refinements. In an embodiment, the first vehicle can transmit the LOS vehicle information to a BS and the BS may allocate resources to the vehicles based on the LOS vehicle information. In some embodiments, the first vehicle may transmit LOS ranging measurements to the BS and the BS may track the positioning of the vehicles and refine the positioning of the vehicles based on the LOS ranging measurements. The disclosed embodiments may employ a combination of long-range and short-range wireless technologies for V2V and/or vehicle-to-infrastructure (V2I) communications. The disclosed embodiments are suitable for use in autonomous driving and/or avoidance collision system.

Aspects of the present application can provide several benefits. For example, while vehicles may be equipped with GPS devices for obtaining GPS coordinates of the vehicles, GPS systems may have limited positioning accuracy, for example, about 2 m to 3 m. The disclosed embodiments combine wireless ranging with LOS sensing to obtain LOS ranging data for refining vehicle positioning. Thus, the disclosed embodiments can improve vehicle positioning accuracy, for example, up to the order of centimeters. In addition, the vehicles may share LOS vehicle information with each other, allowing vehicles without LOS sensors to take advantage of LOS ranging data for refining vehicle positioning.

FIG. 1 illustrates a wireless communication network 100 that facilitates V2V communications according to embodiments of the present disclosure. The network 100 may include a number of vehicles 102 (e.g., shown as 102a to 102f) and a number of BSs 104. The BSs 104 may include an Evolve Node B (eNodeB) or a next Generation Node B (gNB). A BS 104 may be a station that communicates with the vehicles 102 and may also be referred to as a base transceiver station, a node B, an access point, and the like.

The BSs 104 communicate with the vehicles 102. A vehicle 102 may communicate with the BS 104 via an uplink (UL) and a downlink (DL). The downlink (or forward link) refers to the communication link from the BS 104 to the vehicle 102. The UL (or reverse link) refers to the communication link from the vehicle 102 to the BS 104. The BSs 104 may also communicate with one another, directly or indirectly, over wired and/or wireless connections.

The vehicles 102 may be travelling on a roadway 130. The vehicles 102 may travel through different coverage areas or cells 110 in the network 100. The vehicles 102 may have in-vehicle wireless communication devices for communicating with each other and with the BSs 104. The vehicles 102 may have receivers for communication with a global navigation satellite system (GNSS), which may provide location tracking and timing information. The vehicles 102 may have sensors for various sensing, which may be for navigational, safety, and/or performance Some examples of sensors may include Lidars, radars, and high-definition cameras. The network 100 is one example of a network to which various aspects of the disclosure apply.

Each BS 104 may provide communication coverage for a particular geographic area. In 3GPP, the term "cell" can refer to this particular geographic coverage area of a BS and/or a BS subsystem serving the coverage area, depending on the context in which the term is used. In this regard, a BS 104 may provide communication coverage for a macro cell, a pico cell, a femto cell, and/or other types of cell with varying coverage areas and access restrictions. As shown, the BSs 104a, 104b, and 104c provide communication coverage in the cells 110a, 110b, and 110c, respectively. In some embodiments, a BS 104 may support one or multiple (e.g., two, three, four, and the like) cells.

The network 100 may support synchronous or asynchronous operation. For synchronous operation, the BSs 104 may have similar frame timing, and transmissions from different BSs 104 may be approximately aligned in time. For asynchronous operation, the BSs 104 may have different frame timing, and transmissions from different BSs 104 may not be aligned in time.

In some implementations, the network 100 utilizes orthogonal frequency division multiplexing (OFDM) on the downlink and single-carrier frequency division multiplexing (SC-1-DM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

In an embodiment, communications in the network 100 may be performed in the form of radio frames. A radio frame may include a plurality of subframes. Each subframe may include a plurality of symbols spanning a frequency band and a time interval. The network 100 may employ various transmission configurations. For example, each radio frame may include one or more subframes for DL transmissions and one or more subframes for UL transmissions.

In the network 100, the vehicles 102 may employ various wireless communication technologies. In some embodiments, the network 100 may support LTE-based V2V, LTE-based V2I, LTE-based device-to-device (D2D), or direct short range communication (DSRC) communications. In an embodiment, each vehicle 102 is configured to determine the positioning of the vehicle 102 and communicate positioning information to surrounding vehicles 102, for example, to facilitate autonomous driving and/or collision avoidance on the roadway 130. Each vehicle 102 may periodically broadcast the position (e.g., GPS coordinates) of the vehicle 102 and an identifier (ID) for identifying the vehicle 102 in the network 100. In some embodiments, the broadcast may be at intervals of about 100 milliseconds (ms) or any suitable time interval. Other vehicles 102 may receive the positioning information and control corresponding driving operations according to the positioning information. To improve the accuracy of the positioning, the vehicles 102 may perform ranging with each other and refine the positioning based on the ranging measurements. Ranging refers to measuring distances between pairs of vehicles. In some embodiments, ranging can improve the accuracies of the positioning to the order of centimeters. The vehicles 102 may include ranging measurements from LOS vehicles for the refinements and exclude NLOS ranging measurements, as described in greater detail herein.

Although not shown, the network 100 may further include a number of user equipments (UEs) in communication with the BSs 104. A UE may be a cellular phone, a smartphone, a personal digital assistant, a wireless modem, a laptop computer, a tablet computer, etc. In some embodiments, the UEs and the vehicles 102 may employ a similar initial attachment procedure to communicate initiate communication with the BSs 104. For example, the initial attachment procedure may be similar to the LTE random access procedure.

Figure 2:
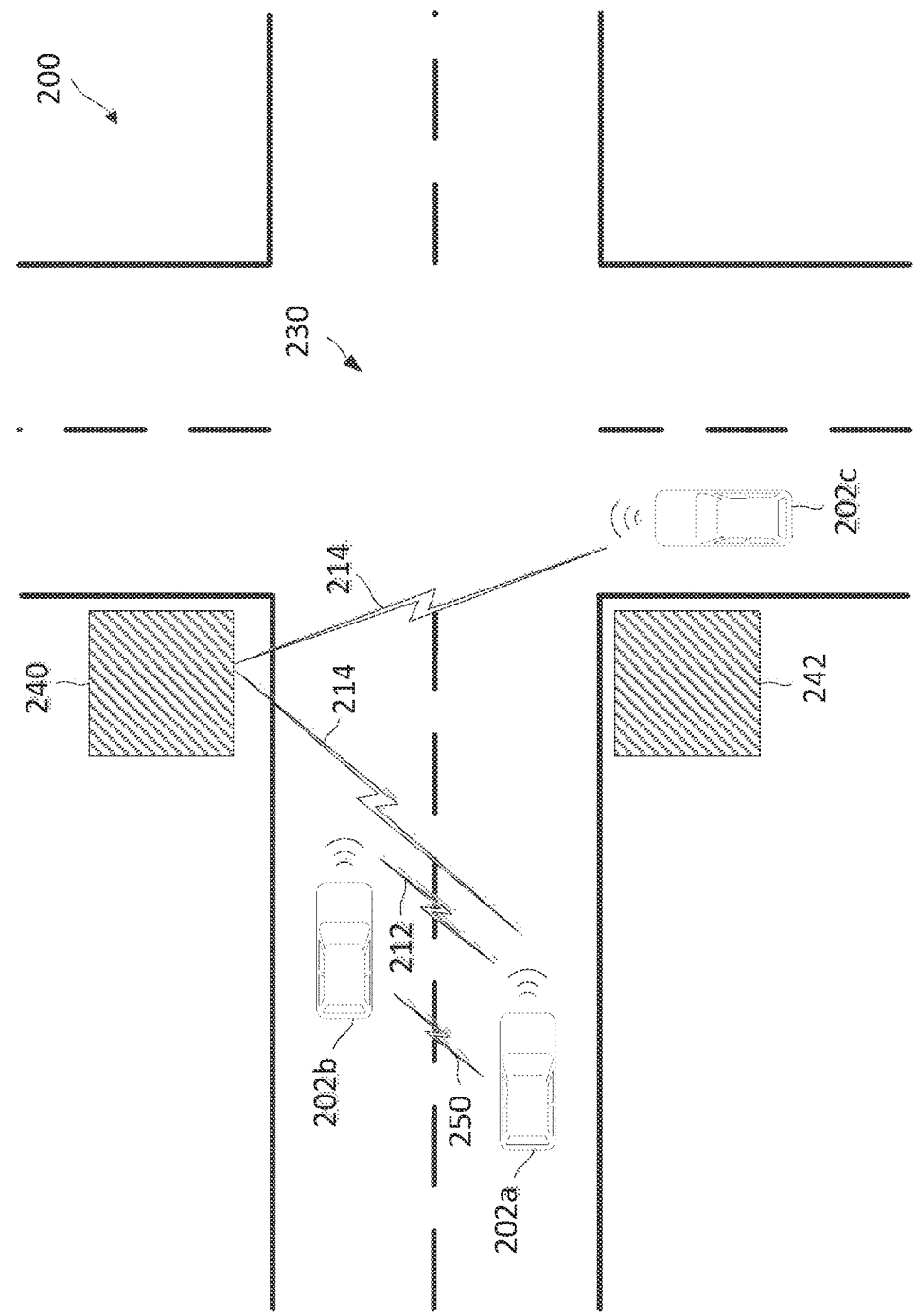
FIG. 2 illustrates a ranging scenario among vehicles in a wireless communication network according to embodiments of the present disclosure.

FIG. 2 illustrates a ranging scenario 200 among vehicles in a wireless communication network similar to the network 100 according to embodiments of the present disclosure. FIG. 2 illustrates three vehicles 202 travelling on a roadway 230 for purposes of simplicity of discussion, though it will be recognized that embodiments of the present disclosure may scale to many more vehicles 202. The vehicles 202 are similar to the vehicles 102 and may communicate with each other using any suitable wireless communication technologies. The vehicles 202 perform ranging with each other and use the ranging measurements to refine positioning of the vehicles 202. The vehicles 202 may include wireless transceivers implementing any suitable wireless communication protocols, such as LTE and/or 5G, for performing ranging.

To perform ranging, the vehicle 202*b* may transmit a ranging signal 212 (e.g., an electromagnetic signal) to the vehicle 202*a*. The vehicle 202*a* may receive the ranging signal 212 and determine a propagation time for the ranging signal 212. For example, the vehicle 202*b* may transmit the ranging signal 212 along with a transmission time of the ranging signal 212 at the vehicle 202*b*. Thus, the vehicle 202*a* may determine the propagation time by computing a difference between the transmission time and a reception time or arrival time of the ranging signal 212 at the vehicle 202*a*. The vehicle 202*a* may subsequently compute a relative distance between the vehicle 202*a* and the vehicle 202*b*, for example, based on a velocity of the ranging signal 212 and the computed propagation time. As shown, the ranging signal 212 is a LOS signal travelling along a direct LOS communication path (e.g., an unobstructed path) from the vehicle 202*b* to the vehicle 202*a*. Thus, the vehicle 202*a* may estimate an accurate relative distance between the vehicle 202*a* and the vehicle 202*b*.

Similarly, the vehicle 202*c* may transmit a ranging signal 214 to the vehicle 202*a*. The vehicle 202*a* may receive the ranging signal 214 and determine a relative distance between the vehicle 202*a* and the vehicle 202*c*. However, the vehicle 202*c* is not along a LOS communication path of the vehicle 202*a* (e.g., blocked by an obstacle 242). Thus, the ranging signal 214 is a NLOS signal. As shown, the ranging signal 214 is reflected by an obstacle 240 before reaching the vehicle 202*a*. Thus, the vehicle 202*a* may estimate a relative distance between the vehicle 202*a* and the vehicle 202*c* that is longer than the actual relative distance. As such, the relative distance estimated from the NLOS ranging signal 214 is inaccurate.

In order to apply LOS ranging measurements to refine vehicle positioning, the vehicle 202*a* may include sensors such as a front-facing camera and/or a rear-facing camera, which operate based on LOS sensing, to identify LOS vehicles. As shown, the vehicle 202*a* may receive sensor data or camera images of the vehicle 202*b* based on a sensing signal 250, but may not receive sensor data about the vehicle 202*c*, which is blocked by the obstacle 242. Thus, the vehicle 202*a* may identify the vehicle 202*b* as a LOS vehicle and include ranging measurements obtained from the vehicle 202*b* for refining the positioning of the vehicle 202*b*. Since the vehicle 202*a* did not receive sensor data about the vehicle 202*c*, the vehicle 202*a* may exclude ranging measurements obtained from the vehicle 202*c* for refining the positioning of the vehicle 202*c*. Thus, the vehicle 202*a* can identify and include LOS ranging measurements based on sensor data received from the sensor for positioning refinements, as described in greater detail herein. In addition, the ranging signals 212 and 214 can additionally indicate IDs of the vehicle 202b and the vehicle 202c, respectively, to enable the vehicle 202a to associate the sensor data with the vehicle 202b, as described in greater detail herein.

Figure 3:
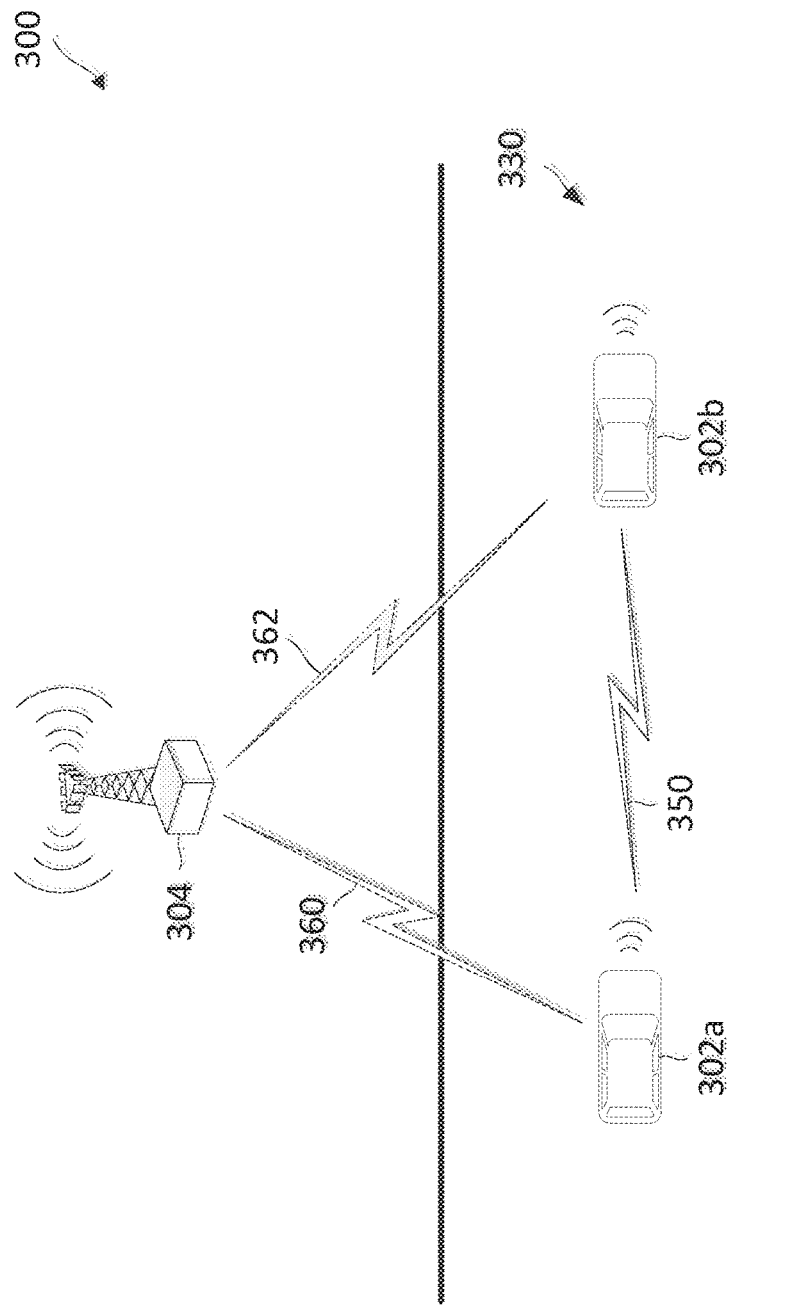
FIG. 3 illustrates a line-of-sight (LOS) vehicle information signaling scenario in a wireless communication network according embodiments of the present disclosure.

FIG. 3 illustrates a LOS vehicle information signaling scenario 300 in a wireless communication network similar to the network 100 according embodiments of the present disclosure. FIG. 3 illustrates a vehicle ranging scenario 300 according to embodiments of the present disclosure. FIG. 3 illustrates two vehicles 302 travelling on a roadway 330 and one BS 304 for purposes of simplicity of discussion, though it will be recognized that embodiments of the present disclosure may scale to many more vehicles 302 and BSs 304. The vehicles 302 are similar to the vehicles 102 and 202. The BS 304 is similar to the BSs 104. The vehicles 202 may communicate with each other and with the BS 304 using any suitable wireless communication technologies.

In the scenario 300, the vehicle 302a and 302b may communicate with each other using V2V communications (e.g., via wireless transceivers) and perform sensing (e.g., via sensors and cameras) to identify LOS vehicles for positioning refinements. As an example, the vehicle 302a has a front-facing camera, whereas the vehicle 302b does not have a rear-facing camera. Thus, the vehicle 302a can sense and detect the presence of the vehicle 302b (e.g., via the sensing signal 350) and may identify the vehicle 302b as a LOS vehicle. However, the vehicle 302b may not identify the vehicle 302a as a LOS vehicle due to the absence of a rear-facing camera. Thus, the vehicle 302b may not include ranging measurements from the vehicle 302a even though the vehicle 302b has a direct LOS communication path to the vehicle 302a.

In order to enable the vehicle 302b to apply ranging data measured from the vehicle 302a, the vehicle 302a may broadcast LOS vehicle information indicating that the vehicle 302b is a LOS vehicle to the vehicle 302a. When the vehicle 302b receives the LOS vehicle information, the vehicle 302b can associate the vehicle 302a as a LOS vehicle and may use ranging signals transmitting by the vehicle 302a to refine the positioning of the vehicle 302a.

Alternatively, the vehicle 320a may transmit the LOS vehicle information to the BS 304 as shown by the signal 360 and the BS 304 may transmit the LOS vehicle information to the vehicle 302b as shown by the signal 362. Similarly, the vehicle 302b can associate the vehicle 302a as a LOS vehicle based on the LOS vehicle information. In some embodiments, the BS 304 may allocate resources for the vehicle 302a and the vehicle 302b based on the LOS vehicle information. For example, the BS 304 may schedule or allocate different resources (e.g., time-frequency resources) to the vehicle 302a and the vehicle 302b for D2D or V2V communications.

In some embodiments, the vehicle 302a and/or the vehicle 302b may report ranging measurements (e.g., relative distances between the vehicles 302a and 302b) to the BS 304. For example, the BS 304 may track and maintain a mapping of vehicles in a coverage area of the BS 304 and update or refine the positioning of the vehicles in the mapping based on the reported ranging measurements.

In some embodiments, the broadcasting of the LOS vehicle information may enable the vehicles 302 to additionally determine Doppler shifts when the vehicles 302 are within LOS of each other. For example, the vehicles 302a may periodically broadcast the position, the ID, and the speed of the vehicles 302a. Similarly, the vehicles 302b may periodically broadcast the position, the ID, and the speed of the vehicles 302b. Thus, the LOS vehicles 302 and 302b may each estimate a Doppler shift between the vehicle 302a and vehicle 302b based on the speeds of the vehicles 302a and 302b. Subsequently, the vehicle 302a may compensate the vehicle 302a's receiver with the estimated Doppler shift when decoding V2V messages received from the vehicle 302b, which may improve decoding performance. Similarly, the vehicle 302b may compensate the vehicle 302b's receiver with the estimated Doppler shift when decoding V2V messages received from the vehicle 302a.

Figure 4:
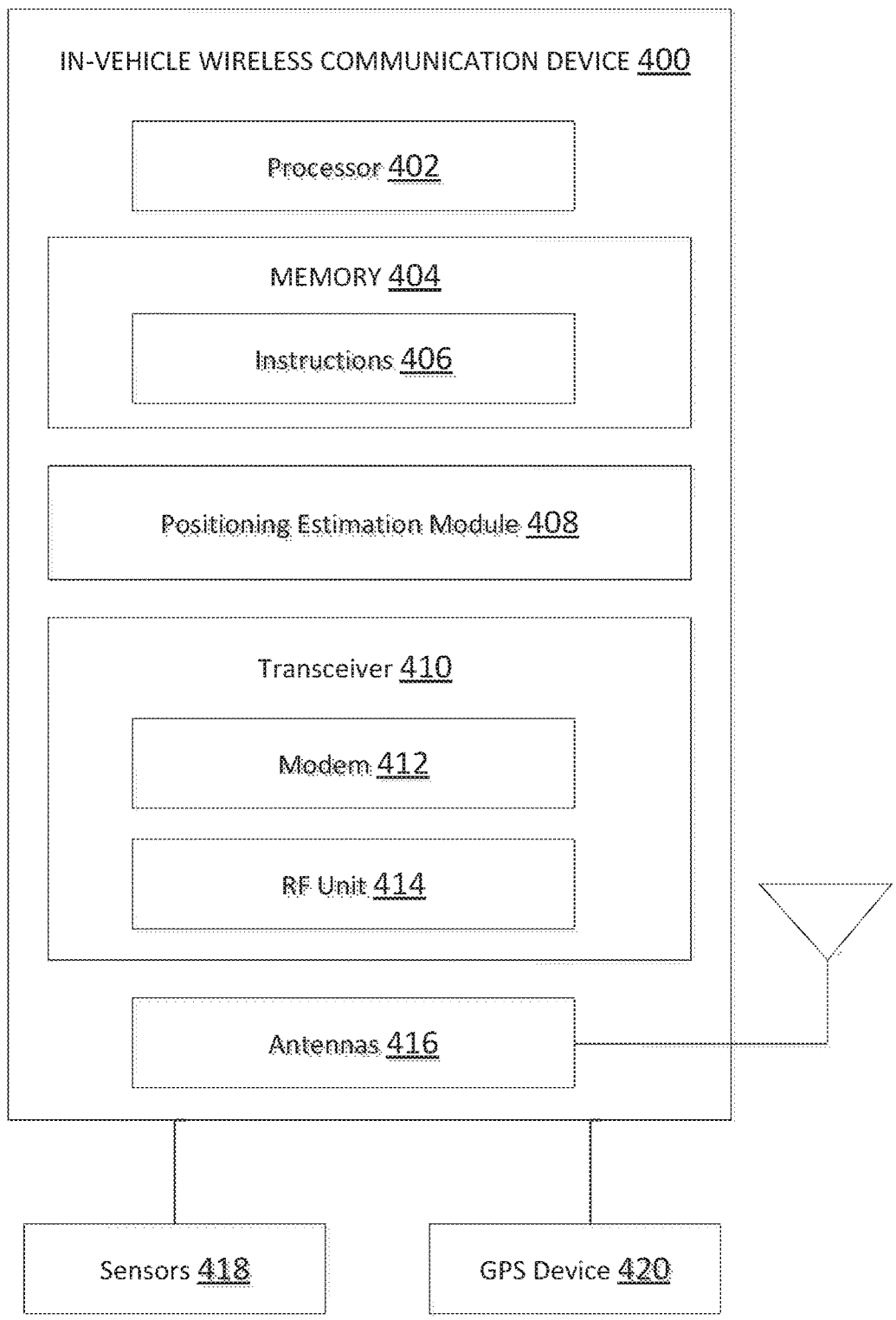
FIG. 4 is a block diagram of an exemplary in-vehicle wireless communication device, sensors, and a global positioning system (GPS) device according to embodiments of the present disclosure.

FIG. 4 is a block diagram of an exemplary in-vehicle wireless communication device 400, sensors 418, and GPS device 420 according to embodiments of the present disclosure. The in-vehicle wireless communication device 400, the sensors, and the GPS device 420 may be located in the vehicles 102, 202, and 302 as discussed above. The in-vehicle wireless communication device 400 may be in direct or indirect communication with the sensors 418 and the GPS device 420. The sensors 418 may include various types of sensors, such as Lidars, radars, and cameras, and may configured to detect LOS vehicles. The GPS device 420 may be configured to communicate with GPS satellite systems and determine position, velocity, and time.

The in-vehicle wireless communication device 400 may include a processor 402, a memory 404, a positioning estimation module 408, a transceiver 410 including a modem subsystem 412 and a radio frequency (RF) unit 414, and an antenna 416. These elements may be in direct or indirect communication with each other, for example via one or more buses or other communication mediums.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the vehicles 102 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The positioning estimation module 408 may be implemented via hardware, software, or combinations thereof. For example, the positioning estimation module 408 may be implemented as a processor, circuit, and/or instructions 406 stored in the memory 404 and executed by the processor 402. The positioning estimation module 408 may be used for various aspects of the present disclosure. For example, the positioning estimation module 408 is configured to receive sensor data from the sensors 418 for identifying LOS vehicles, perform ranging with surrounding vehicles, and refining positions of LOS vehicles based on the sensor data and the ranging measurements, as described in greater detail herein.

As shown, the transceiver 410 may include the modem subsystem 412 and the RF unit 414. The transceiver 410 can be configured to communicate bi-directionally with other devices, such as the BSs 104. The modem subsystem 412 may be configured to modulate and/or encode the data from the memory 404 and/or the positioning estimation module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a vehicle 102, 202, and 302 or a BS 104. The RF unit 414 may be further configured to perform analog beamforming in conjunction with the digital beamforming. Although shown as integrated together in transceiver 410, the modem subsystem 412 and the RF unit 414 may be separate devices that are coupled together at the vehicle 102, 202, or 302 to enable the vehicle 102, 202, or 302 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of channel reservation signals to contend for channel resources and sensing information associated with observed objects according to embodiments of the present disclosure. The antenna 416 may further receive data messages transmitted from other devices. This may include, for example, reception of a transmission grant or messages from other vehicles 102, 202, and 302 according to embodiments of the present disclosure. The antenna 416 may provide the received data messages for processing and/or demodulation at the transceiver 410. Although FIG. 4 illustrates antenna 416 as a single antenna, antenna 416 may include multiple antennas of similar or different designs in order to sustain multiple transmission links. The RF unit 414 may configure the antenna 416

Figure 5:
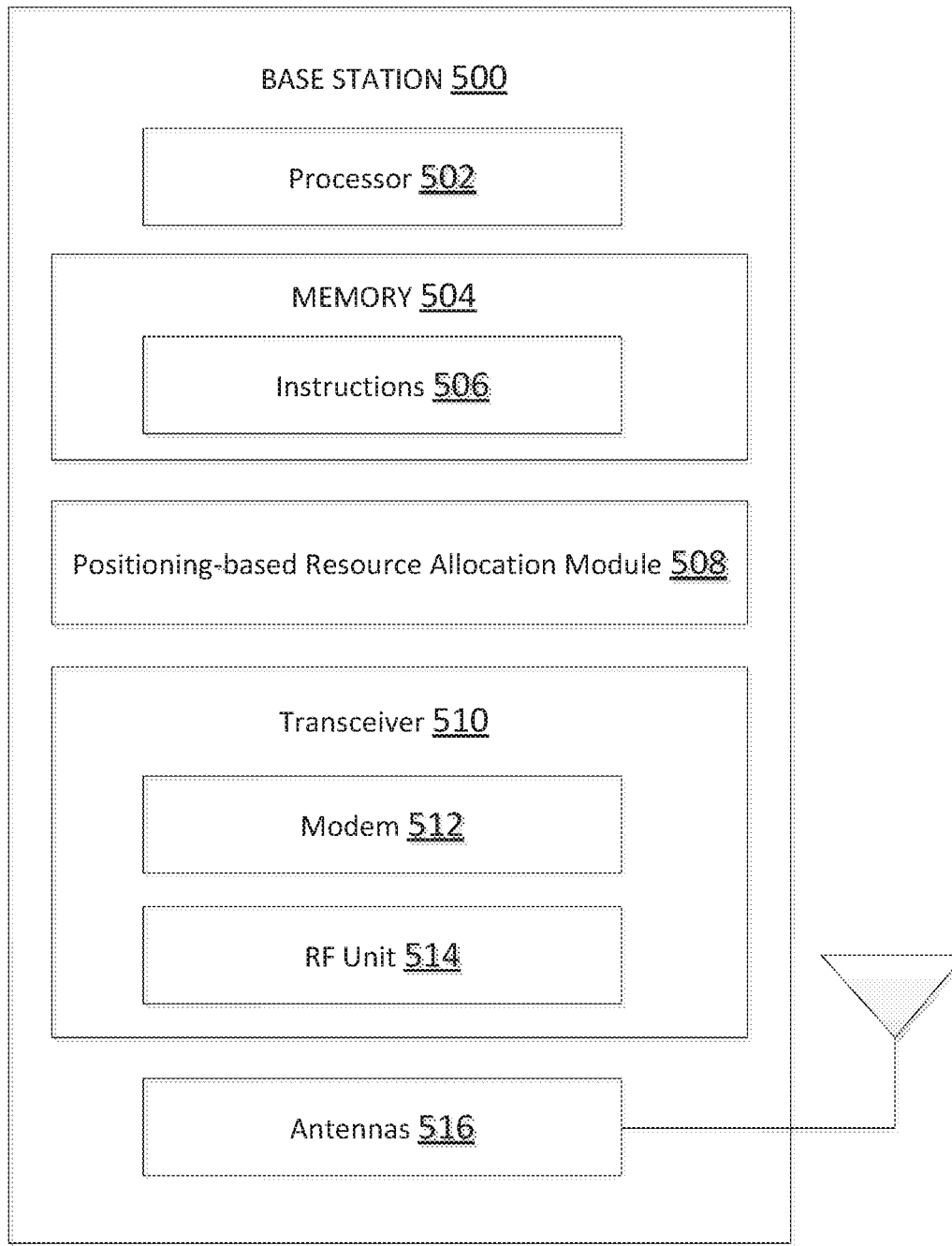
FIG. 5 illustrates a block diagram of an exemplary base station (BS) according to embodiments of the present disclosure.

FIG. 5 illustrates a block diagram of an exemplary BS 500 according to embodiments of the present disclosure. The BS 500 may be a BS 104 or 304 as discussed above. As shown, the BS 500 may include a processor 502, a memory 504, a positioning-based resource allocation module 508, a transceiver 510 including a modem subsystem 512 and a RF unit 514, and an antenna 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 4.

The positioning-based resource allocation module 508 may be used for various aspects of the present disclosure. For example, the positioning-based resource allocation module 508 is configured to receive LOS vehicle information from vehicles such as the vehicles 102, 202, and 302 and allocate resources to the vehicles for V2V communications based on LOS vehicle information such that LOS vehicles are allocated with different resources (e.g., time-frequency resources), as described in greater detail herein.

As shown, the transceiver 510 may include the modem subsystem 512 and the RF unit 514. The transceiver 510 can be configured to communicate bi-directionally with other devices, such as the vehicles 102 and 202 and the wireless communication device 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a vehicle 102, 202, or 302. Although shown as integrated together in transceiver 510, the modem subsystem 512 and the RF unit 514 may be separate devices that are coupled together at the BS 104 to enable the BS 104 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of information to complete attachment to a network and communication with a camped vehicle 102 according to embodiments of the present disclosure. The antenna 516 may further receive data messages transmitted from other devices and provide the received data messages for processing and/or demodulation at the transceiver 510. Although FIG. 5 illustrates antenna 516 as a single antenna, antenna 516 may include multiple antennas of similar or different designs in order to sustain multiple transmission links.

Figure 6:
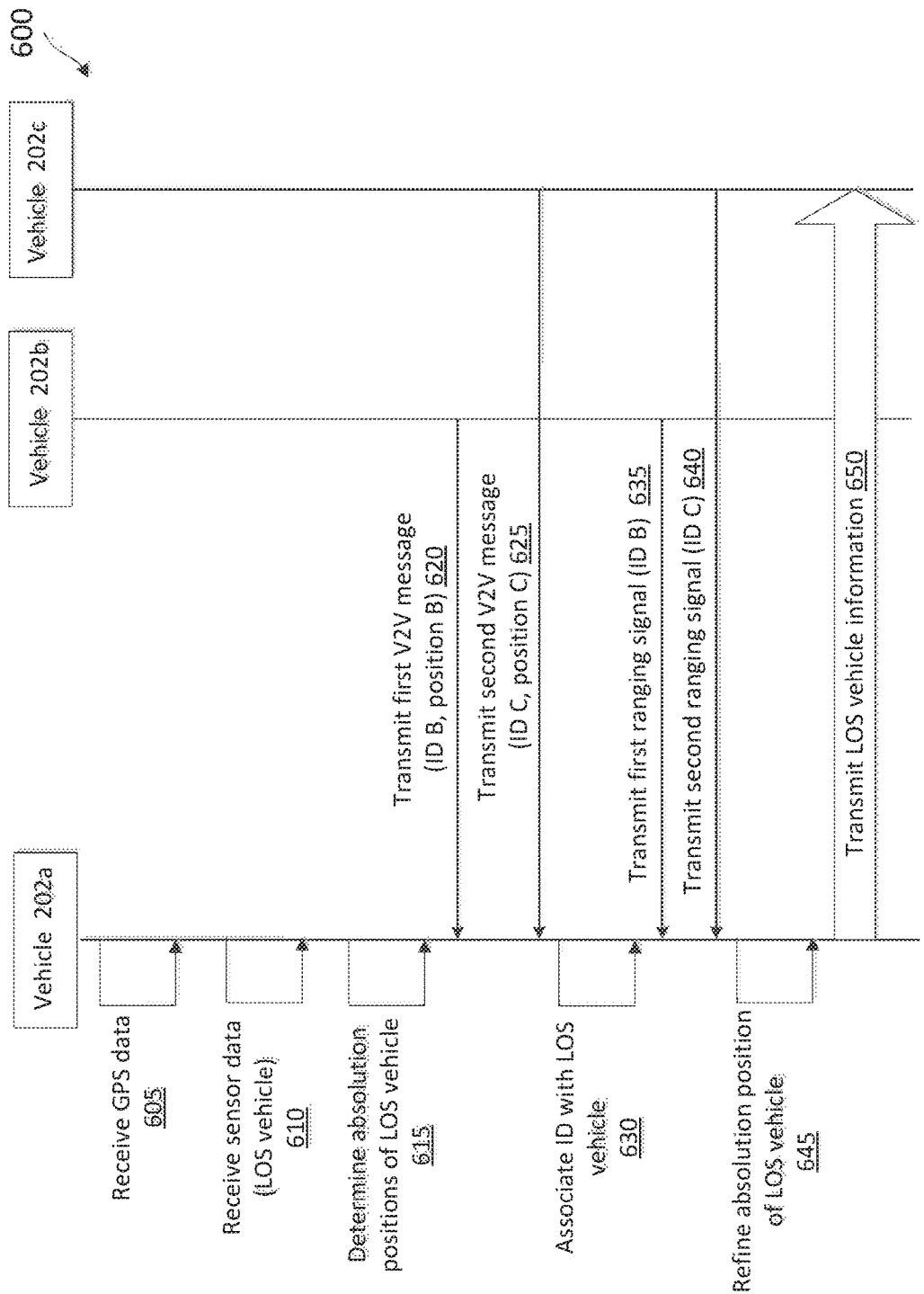
FIG. 6 is a signaling diagram of a method of improving vehicle positioning based on LOS ranging measurements according to embodiments of the present disclosure.

FIG. 6 is a signaling diagram of a method 600 of improving vehicle positioning based on LOS ranging measurements according to embodiments of the present disclosure. Steps of the method 600 can be executed by computing devices (e.g., a processor, processing circuit, and/or other suitable component) of vehicles, such as the vehicles 102, 202, and 302. The method 600 can be better understood with reference to FIG. 2. As illustrated, the method 600 includes a number of enumerated steps, but embodiments of the method 600 may include additional steps before, after, and in between the enumerated steps. In some embodiments, one or more of the enumerated steps may be omitted or performed in a different order. The method 600 illustrates three vehicles 202a, 202b, and 202c for purposes of simplicity of discussion, though it will be recognized that embodiments of the present disclosure may scale to many more vehicles 202.

At step 605, the vehicle 202a receives GPS data via a GPS device such as the GPS device 420 of the vehicle 202a. The GPS data may indicate a GPS positioning coordinate of the vehicle 202a.

At step 610, the vehicle 202a receives sensor data (e.g., the sensor signal 250) via sensors such as the sensors 418 of vehicle 202b. The sensor data may indicate the detection or presence of the vehicle 202b. Thus, the vehicle 202a may identify the vehicle 202b as a LOS vehicle.

At step 615, the vehicle 202a determines an absolute position of the vehicle 202b. For example, the vehicle 202a determines a relative position of the vehicle 202b with respect to the vehicle 202a based on the received sensor data and determines the absolute position (e.g., a positioning coordinate) based on the relative position and the GPS positioning coordinate of the vehicle 202a.

At step 620, the vehicle 202b transmits a first V2V message via a built-in wireless communication device such as the wireless communication device 400. The transmission may be a broadcast transmission. The first V2V message may indicate an ID (e.g. ID B) and a position (e.g., position B) of the vehicle.

At step 625, the vehicle 202c transmits a second V2V message via a built-in wireless communication device. Similarly, the transmission may be a broadcast transmission. The second V2V message may indicate an ID (e.g., ID C) and a position (e.g., position C) of the vehicle 202c.

At step 630, upon receiving the first V2V message and the second V2V message via a built-in wireless communication device, the vehicle 202a associates ID B received from the first V2V message with the identified LOS vehicle 202b. For example, the vehicle 202a determines that the position B of the vehicle 202b received from the first V2V message corresponds to the absolution position of the vehicle 202b. Thus, the vehicle 202a maintains an association or a mapping between the LOS vehicle 202b and the ID B received from the first V2V message.

At step 635, the vehicle 202b transmits a first ranging signal (e.g., the LOS ranging signal 212) and indicates the ID B of the vehicle 202b. At step 640, the vehicle 202c transmits a second ranging signal (e.g., the NLOS ranging signal 214) and indicates the ID C of the vehicle 202c.

At step 645, upon receiving the first ranging signal and the second ranging signal, the vehicle 202a determines a relative distance between the vehicle 202a and the LOS vehicle 202b and refines the absolute position of the vehicle 202b based on the relative distance. The vehicle 202b may refrain from computing and/or applying a relative distance between the vehicle 202a and the vehicle 202c for positioning refinement since the vehicle 202a did not receive sensor data indicating that the vehicle 202c is a LOS vehicle.

At step 650, the vehicle 202a broadcasts LOS vehicle information indicating that the vehicle 202a and the vehicle 202b are along a LOS communication path. For example, the LOS vehicle information can include an ID of the vehicle 202a, a position of the vehicle 202a, an ID of the vehicle 20b, and a position of the vehicle 202b. Subsequently, the vehicle 202b may perform positioning refinements based on the LOS vehicle information as shown in the scenario 300.

Figure 7:
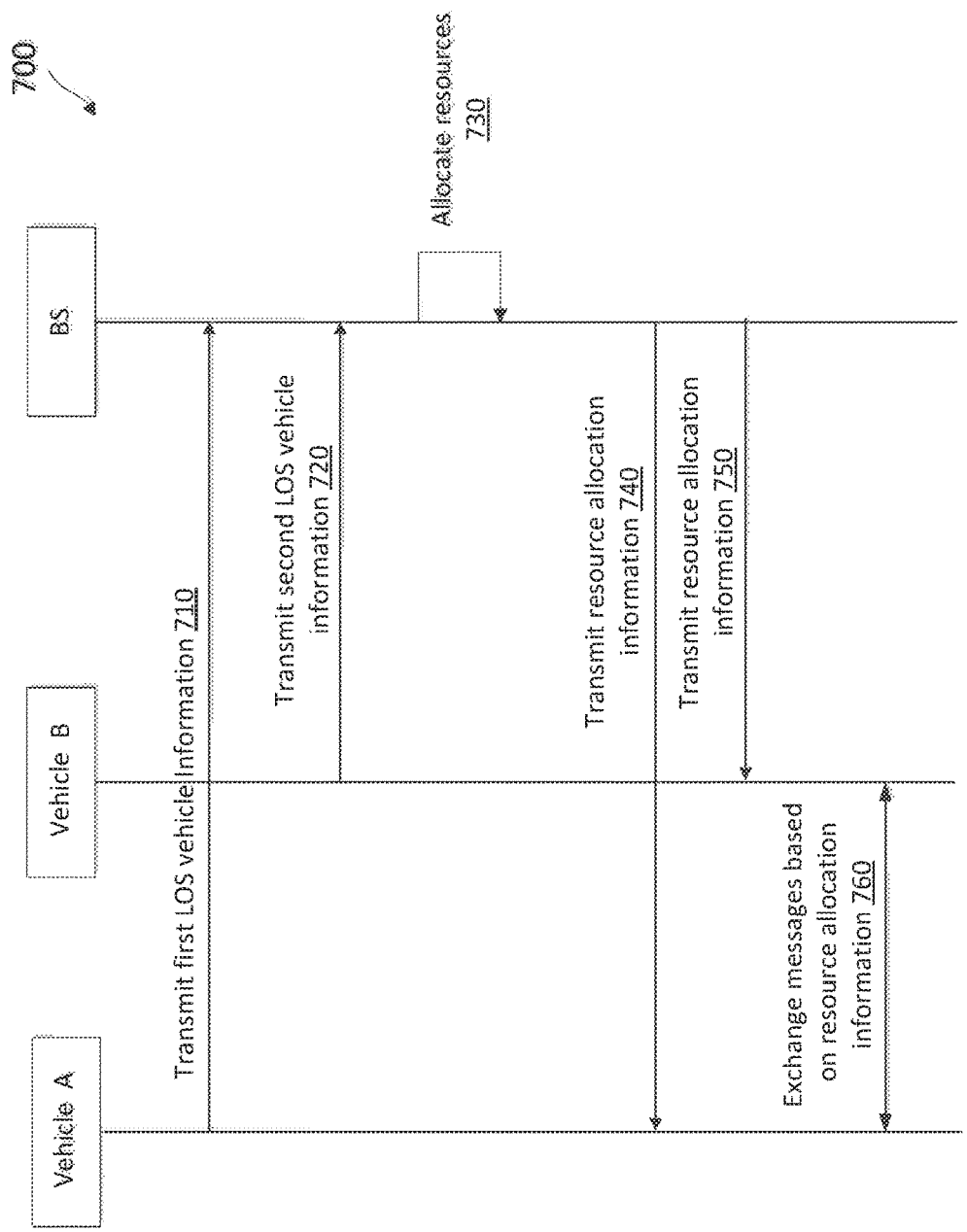
FIG. 7 is a signaling diagram of a method of performing positioning-based resource allocation according to embodiments of the present disclosure.

FIG. 7 is a signaling diagram of a method 700 of performing positioning-based resource allocation according to embodiments of the present disclosure. Steps of the method 700 can be executed by computing devices (e.g., a processor, processing circuit, and/or other suitable component) of vehicles such as the vehicles 102, 202, and 302 and a BS such as the BSs 104 and 304. The method 700 can be better understood with reference to FIG. 3. As illustrated, the method 700 includes a number of enumerated steps, but embodiments of the method 700 may include additional steps before, after, and in between the enumerated steps. In some embodiments, one or more of the enumerated steps may be omitted or performed in a different order. The method 700 illustrates three vehicles A and B and one BS for purposes of simplicity of discussion, though it will be recognized that embodiments of the present disclosure may scale to many more vehicles and BSs. The method 700 may begin after vehicles A and B performed the steps of 605-645 of the method 600.

At step 710, the vehicle A transmits first LOS vehicle information to the BS, for example, indicating that the vehicle B is a LOS vehicle to the vehicle A.

At step 720, the vehicle B transmits second LOS vehicle information to the BS, for example, indicating that the vehicle A is a LOS vehicle to the vehicle B.

At step 730, upon receiving the first LOS vehicle information and/or the second LOS vehicle information, the BS allocates resources to the vehicle A and the vehicle B for V2V or D2D communications based on the first LOS information and/or the second LOS vehicle information. The BS may avoid allocating the same resources to the vehicle A and the vehicle B that are within LOS. For example, the BS may allocate a first resource to the vehicle A and a second resource to the vehicle B, where the first resource and the second resource are difference resources.

At step 740, the BS transmits resource allocation information to the vehicle A indicating the first resource.

At step 750, the BS transmits resource allocation information to the vehicle B indicating the second resource.

At step 760, the vehicle A and the vehicle B may exchange V2V messages based on the resource allocation information. For example, the vehicle A may transmit a V2V message on the first resource indicating an ID, a position, and/or a speed of the vehicle A. Similarly, the vehicle B may transmit a V2V message on the second resource indicating an ID, a position, and/or a speed of the vehicle B.

Figure 8:
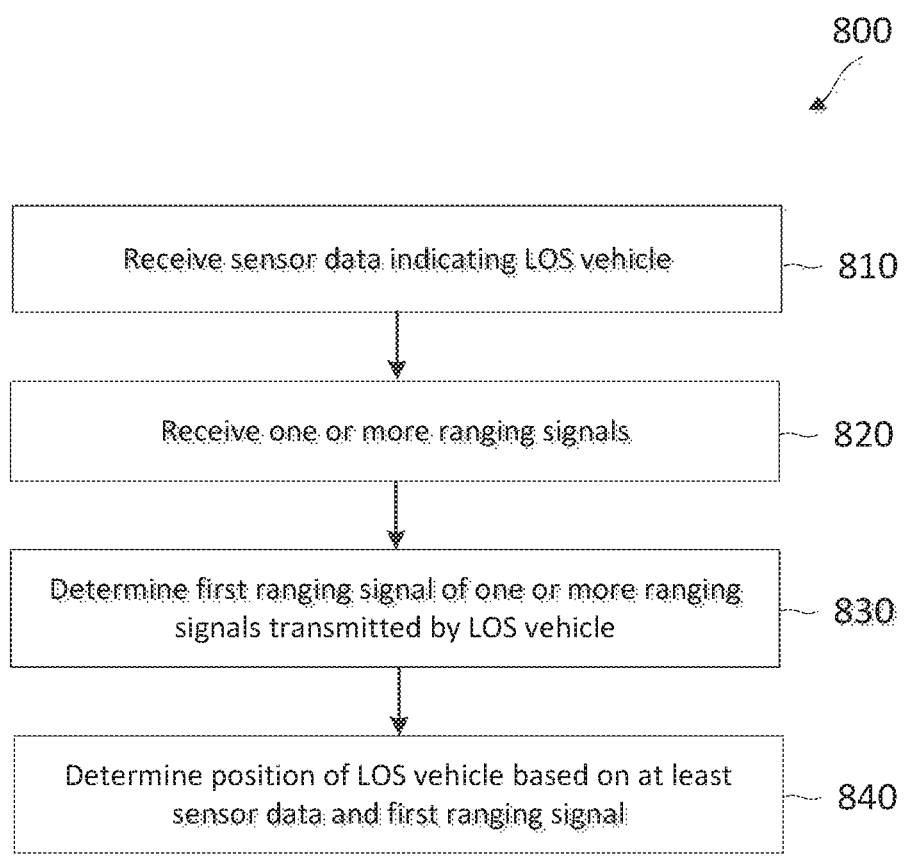
FIG. 8 is a flow diagram of a method of improving vehicle positioning based on LOS ranging measurements according to embodiments of the present disclosure.

FIG. 8 is a flow diagram of a method 800 of improving vehicle positioning based on LOS ranging measurements according to embodiments of the present disclosure. Steps of the method 800 can be executed by a computing device (e.g., a processor, processing circuit, and/or other suitable component) of a wireless communication device, such as the vehicles 102, 202, and 302, and the in-vehicle wireless communication device 400. The method 800 may employ similar mechanisms as described in the scenarios 200 and 300 and the method 600 described with respect to FIGS. 2, 3, and 6, respectively. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the method 800 includes receiving, by a sensor (e.g., the sensors 418) of a first vehicle (e.g., the vehicles 202a and 302a), sensor data indicating a LOS vehicle (e.g., the vehicles 202b and 302b).

At step 820, the method 800 includes receiving, by a wireless communication device (e.g., the wireless communication device 400) of the first vehicle, one or more ranging signals (e.g., the ranging signals 212 and 214).

At step 830, the method 800 includes determining, by the first vehicle, that a first ranging signal (e.g., the ranging signal 212) of the one or more ranging signals is transmitted by the LOS vehicle. The first vehicle may employ similar mechanisms as described in the method 600 to associate the first ranging signal with the LOS vehicle.

At step 840, the method 800 includes determining, by the first vehicle, a position of the LOS vehicle based on at least the sensor data and the first ranging signal.

Figure 9:
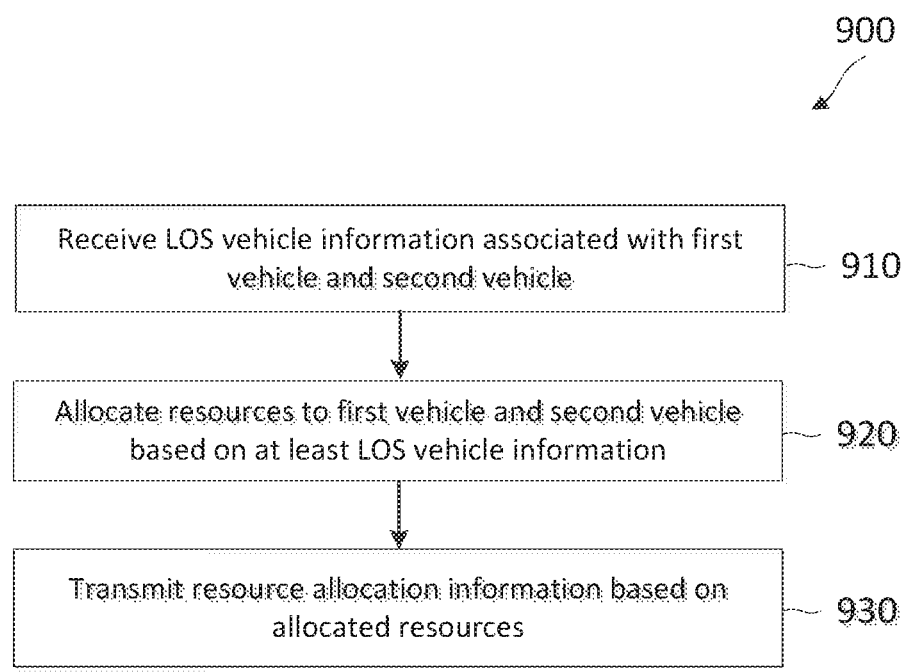
FIG. 9 is a flow diagram of a method of performing positioning-based resource allocation according to embodiments of the present disclosure.

FIG. 9 is a flow diagram of a method 900 of performing positioning-based resource allocation according to embodiments of the present disclosure. Steps of the method 900 can be executed by a computing device (e.g., a processor, processing circuit, and/or other suitable component) of a wireless communication device, such as the BS 104, 304, and 500. The method 900 may employ similar mechanisms as described in the scenario 300 and the method 700 described with respect to FIGS. 3 and 7, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes receiving, by a BS from a first vehicle (e.g., the vehicle 202a or 302a), LOS vehicle information associated with the first vehicle and a second vehicle (e.g., the vehicle 202b or 302b) positioned along a LOS communication path of the first vehicle.

At step 920, the method 900 includes allocating, by the BS, resources to the first vehicle and the second vehicle based on the LOS vehicle information. For example, the BS may allocate a first resource of the resources to the first vehicle and a second resource of the resources to the second vehicle for V2V or D2D communications, where the first resource and the second resource are different resources.

At step 930, the method 900 includes transmitting by the base station, resource allocation information based on the allocating.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a method of wireless communication, comprising receiving, by a sensor of a first vehicle, sensor data indicating a line-of-sight (LOS) vehicle; receiving, by a wireless communication device of the first vehicle, one or more ranging signals; determining, by the first vehicle, that a first ranging signal of the one or more ranging signals is transmitted by the LOS vehicle; and determining, by the first vehicle, a position of the LOS vehicle based on at least the sensor data and the first ranging signal.

The method further includes wherein the determining the position of the LOS vehicle includes determining a relative position of the LOS vehicle with respect to the first vehicle based on the sensor data; and determining the position of the LOS vehicle based on global positioning system (GPS) coordinate data of the first vehicle and the relative position. The method further includes wherein the determining the position of the LOS vehicle includes determining a relative distance between the first vehicle and the LOS vehicle based on the first ranging signal, and wherein the method further comprises updating the position of the LOS vehicle based on the relative distance. The method further includes receiving, by the first vehicle from a second vehicle, a message indicating a position of the second vehicle and an identifier (ID) of the second vehicle; determining, by the first vehicle, that the second vehicle corresponds to the LOS vehicle based on the position of the LOS vehicle and the position of the second vehicle; and associating the ID with the LOS vehicle. The method further includes the first ranging signal indicating an ID of a transmitting vehicle that transmitted the first ranging signal, and wherein the determining that the first ranging signal of the one or more ranging signals is transmitted by the LOS vehicle further includes determining that the ID associated with the LOS vehicle matches the ID of the transmitting vehicle. The method further includes broadcasting, by the first vehicle, LOS vehicle information indicating that the LOS vehicle is along a LOS communication path of the first vehicle, wherein the LOS vehicle information includes at least one of the ID associated with the LOS vehicle, the position of the LOS vehicle, an ID of the first vehicle, or a position of the first vehicle. The method further includes transmitting, by the first vehicle to a base station, LOS vehicle information indicating that the LOS vehicle is along a LOS communication path of the first vehicle, wherein the LOS vehicle information includes at least one of the ID associated with the LOS vehicle, the position of the LOS vehicle, an ID of the first vehicle, or a position of the first vehicle. The method further includes receiving, by the first vehicle from the base station, resource allocation information based on the LOS vehicle information; and transmitting, by the first vehicle based on the resource allocation information, a message indicating positioning information of the first vehicle. The method further includes transmitting, by the first vehicle to a second vehicle, a second ranging signal indicating an identifier (ID) of the first vehicle. The method further includes receiving, by the first vehicle from the LOS vehicle, a first message indicating a speed of the LOS vehicle; determining, by the first vehicle, a Doppler shift between the first vehicle and the LOS vehicle based on the speed of the LOS vehicle and a speed of the first vehicle; receiving, by the first vehicle from the LOS vehicle, a second message; and decoding, by the first vehicle, the second message based on the Doppler shift. The method further includes receiving, by the first vehicle, LOS vehicle information indicating a second vehicle is along a LOS communication path of the first vehicle and a position of the second vehicle; receiving, by the first vehicle from the second vehicle, a second ranging signal; and updating, by the first vehicle, the position of the second vehicle based on the second ranging signal. The method further includes wherein the sensor is at least one of a front-facing camera or a rear-facing camera.

Embodiments of the present disclosure further include a method of wireless communication, comprising receiving, by a base station from a first vehicle, line-of-sight (LOS) vehicle information associated with the first vehicle and a second vehicle positioned along a LOS communication path of the first vehicle; allocating, by the base station, resources to the first vehicle and the second vehicle based on the LOS vehicle information; and transmitting, by the base station, resource allocation information based on the allocating.

The method further includes wherein the LOS vehicle information includes at least one of an identifier (ID) of the first vehicle, an ID of the second vehicle, a position of the first vehicle, and a position of the second vehicle. The method further includes wherein the allocating includes allocating a first resource of the resources to the first vehicle; and allocating a second resource of the resources to the second vehicle, wherein the first resource and the second resource are different.

Embodiments of the present disclosure further include an apparatus associated with a first vehicle, comprising a sensor configured to receive sensor data indicating a line-of-sight (LOS) vehicle; a wireless communication device configured to receive one or more ranging signals; and a processor configured to determine that a first ranging signal of the one or more ranging signals is transmitted by the LOS vehicle; and determine a position of the LOS vehicle based on at least the sensor data and the first ranging signal.

The apparatus further includes wherein the processor is further configured to determine the position of the LOS vehicle by determining a relative position of the LOS vehicle with respect to the first vehicle based on the sensor data; and determining the position of the LOS vehicle based on global positioning system (GPS) coordinate data of the first vehicle and the relative position. The apparatus further includes wherein the processor is further configured to determine the position of the LOS vehicle by determining a relative distance between the first vehicle and the LOS vehicle based on the first ranging signal; and update the position of the LOS vehicle based on the relative distance. The apparatus further includes wherein the wireless communication device is further configured to receive, from a second vehicle, a message indicating a position of the second vehicle and an identifier (ID) of the second vehicle, and wherein the processor is further configured to determine that the second vehicle corresponds to the LOS vehicle based on the position of the LOS vehicle and the position of the second vehicle; and associate the ID with the LOS vehicle. The apparatus further includes wherein the first ranging signal indicates an ID of a transmitting vehicle that transmitted the first ranging signal, and wherein the processor is further configured to determine that the first ranging signal of the one or more ranging signals is transmitted by the LOS vehicle further by determining that the ID associated with the LOS vehicle matches the ID of the transmitting vehicle. The apparatus further includes wherein the wireless communication device is further configured to broadcast LOS vehicle information indicating that the LOS vehicle is along a LOS communication path of the first vehicle, and wherein the LOS vehicle information includes at least one of the ID associated with the LOS vehicle, the position of the LOS vehicle, an ID of the first vehicle, or a position of the first vehicle. The apparatus further includes wherein the wireless communication device is further configured to transmit, to a base station, LOS vehicle information indicating that the LOS vehicle is along a LOS communication path of the first vehicle, and wherein the LOS vehicle information includes at least one of the ID associated with the LOS vehicle, the position of the LOS vehicle, an ID of the first vehicle, or a position of the first vehicle. The apparatus further includes wherein the wireless communication device is further configured to receive, from the base station, resource allocation information based on the LOS vehicle information; and transmit, based on the resource allocation information, a message indicating positioning information of the first vehicle. The apparatus further includes wherein the wireless communication device is further configured to transmit, to a second vehicle, a second ranging signal indicating an identifier (ID) of the first vehicle. The apparatus further includes wherein the wireless communication device is further configured to receive, from the LOS vehicle, a first message indicating a speed of the LOS vehicle; determine a Doppler shift between the first vehicle and the LOS vehicle based on the speed of the LOS vehicle and a speed of the first vehicle; receive, from the LOS vehicle, a second message; and decode the second message based on the Doppler shift. The apparatus further includes wherein the wireless communication device is further configured to receive LOS vehicle information indicating a second vehicle is along a LOS communication path of the first vehicle and a position of the second vehicle; and receive, from the second vehicle, a second ranging signal, and wherein the processor is further configured to update the position of the second vehicle based on the second ranging signal. The apparatus further includes wherein the sensor is at least one of a front-facing camera or a rear-facing camera.

Embodiments of the present disclosure further include a wireless communication device, comprising a receiver configured to receive, from a first vehicle, line-of-sight (LOS) vehicle information associated with the first vehicle and a second vehicle positioned along a LOS communication path of the first vehicle; a processor configured to allocate resources to the first vehicle and the second vehicle based on the LOS vehicle information; and a transmitter configured to transmit resource allocation information based on the allocating.

The wireless communication device further includes wherein the LOS vehicle information includes at least one of an identifier (ID) of the first vehicle, an ID of the second vehicle, a position of the first vehicle, and a position of the second vehicle. The wireless communication device further includes wherein the processor is further configured to allocate the resources to the first vehicle and the second vehicle by allocating a first resource of the resources to the first vehicle; and allocating a second resource of the resources to the second vehicle, wherein the first resource and the second resource are different.

Embodiments of the present disclosure further include a computer-readable medium having program code recorded thereon, the program code comprising code for causing a sensor of a first vehicle to receive sensor data indicating a line-of-sight (LOS) vehicle; code for causing a wireless communication device of the first vehicle to receive one or more ranging signals; code for causing the first vehicle to determine that a first ranging signal of the one or more ranging signals is transmitted by the LOS vehicle; and code for causing the first vehicle to determine a position of the LOS vehicle based on at least the sensor data and the first ranging signal.

The computer-readable medium further includes wherein the code for determining the position of the LOS vehicle is further configured to determine a relative position of the LOS vehicle with respect to the first vehicle based on the sensor data; and determine the position of the LOS vehicle based on global positioning system (GPS) coordinate data of the first vehicle and the relative position. The computer-readable medium further includes wherein the code for determining the position of the LOS vehicle is further configured to determining a relative distance between the first vehicle and the LOS vehicle based on the first ranging signal, and wherein the computer-readable medium further comprises code for causing the first vehicle to update the position of the LOS vehicle based on the relative distance. The computer-readable medium further includes code for causing the first vehicle to receive, from a second vehicle, a message indicating a position of the second vehicle and an identifier (ID) of the second vehicle; code for causing the first vehicle to determine that the second vehicle corresponds to the LOS vehicle based on the position of the LOS vehicle and the position of the second vehicle; and code for causing the first vehicle to associate the ID with the LOS vehicle. The computer-readable medium further includes wherein the first ranging signal indicates an ID of a transmitting vehicle that transmitted the first ranging signal, and wherein the code for determining that the first ranging signal of the one or more ranging signals is transmitted by the LOS vehicle is further configured to determine that the ID associated with the LOS vehicle matches the ID of the transmitting vehicle. The computer-readable medium further includes code for causing the first vehicle to broadcast line-of-sight (LOS) vehicle information indicating that the LOS vehicle is along a LOS communication path of the first vehicle, wherein the LOS vehicle information includes at least one of the ID associated with the LOS vehicle, the position of the LOS vehicle, an ID of the first vehicle, or a position of the first vehicle. The computer-readable medium further includes code for causing the first vehicle to transmit, to a base station, line-of-sight (LOS) vehicle information indicating that the LOS vehicle is along a LOS communication path of the first vehicle, wherein the LOS vehicle information includes at least one of the ID associated with the LOS vehicle, the position of the LOS vehicle, an ID of the first vehicle, or a position of the first vehicle. The computer-readable medium further includes code for causing the first vehicle to receive, from the base station, resource allocation information based on the LOS vehicle information; and code for causing the first vehicle to transmit, based on the resource allocation information, a message indicating positioning information of the first vehicle. The computer-readable medium further includes code for causing the first vehicle to transmit, to a second vehicle, a second ranging signal indicating an identifier (ID) of the first vehicle. The computer-readable medium further includes code for causing the first vehicle to receive, from the LOS vehicle, a first message indicating a speed of the LOS vehicle; code for causing the first vehicle to determine a Doppler shift between the first vehicle and the LOS vehicle based on the speed of the LOS vehicle and a speed of the first vehicle; code for causing the first vehicle to receive, from the LOS vehicle, a second message; and code for causing the first vehicle to decoding the second message based on the Doppler shift. The computer-readable medium further includes code for causing the first vehicle to receive LOS vehicle information indicating a second vehicle is along a LOS communication path of the first vehicle and a position of the second vehicle; code for causing the first vehicle to receive, from the second vehicle, a second ranging signal; and code for causing the first vehicle to update the position of the second vehicle based on the second ranging signal. The computer-readable medium further includes wherein the sensor is at least one of a front-facing camera or a rear-facing camera.

Embodiments of the present disclosure further include a computer-readable medium having program code recorded thereon, the program code comprising code for causing a base station to receive, from a first vehicle, line-of-sight (LOS) vehicle information associated with the first vehicle and a second vehicle positioned along a LOS communication path of the first vehicle; code for causing the base station to allocate resources to the first vehicle and the second vehicle based on the LOS vehicle information; and code for causing a base station to transmit resource allocation information based on the allocating.

The computer-readable medium further includes wherein the LOS vehicle information includes at least one of an identifier (ID) of the first vehicle, an ID of the second vehicle, a position of the first vehicle, and a position of the second vehicle. The computer-readable medium further includes wherein the code for allocating is further configured to allocate a first resource of the resources to the first vehicle; and allocate a second resource of the resources to the second vehicle, wherein the first resource and the second resource are different.

Embodiments of the present disclosure further include an apparatus associated with a first vehicle, comprising means for receiving sensor data indicating a line-of-sight (LOS) vehicle; means for receiving one or more ranging signals; means for determining that a first ranging signal of the one or more ranging signals is transmitted by the LOS vehicle; and means for determining a position of the LOS vehicle based on at least the sensor data and the first ranging signal.

The apparatus further includes wherein the means for determining the position of the LOS vehicle is further configured to determine a relative position of the LOS vehicle with respect to the first vehicle based on the sensor data; and determine the position of the LOS vehicle based on global positioning system (GPS) coordinate data of the first vehicle and the relative position. The apparatus further includes wherein the means for determining the position of the LOS vehicle is further configured to determine a relative distance between the first vehicle and the LOS vehicle based on the first ranging signal, and wherein the apparatus further comprises means for updating the position of the LOS vehicle based on the relative distance. The apparatus further includes means for receiving, from a second vehicle, a message indicating a position of the second vehicle and an identifier (ID) of the second vehicle; means for determining that the second vehicle corresponds to the LOS vehicle based on the position of the LOS vehicle and the position of the second vehicle; and means for associating the ID with the LOS vehicle. The apparatus further includes wherein the first ranging signal indicates an ID of a transmitting vehicle that transmitted the first ranging signal, and wherein the means for determining that the first ranging signal of the one or more ranging signals is transmitted by the LOS vehicle is further configured to determine that the ID associated with the LOS vehicle matches the ID of the transmitting vehicle. The apparatus further includes means for broadcasting line-of-sight (LOS) vehicle information indicating that the LOS vehicle is along a LOS communication path of the first vehicle, wherein the LOS vehicle information includes at least one of the ID associated with the LOS vehicle, the position of the LOS vehicle, an ID of the first vehicle, or a position of the first vehicle. The apparatus further includes means for transmitting, to a base station, line-of-sight (LOS) vehicle information indicating that the LOS vehicle is along a LOS communication path of the first vehicle, wherein the LOS vehicle information includes at least one of the ID associated with the LOS vehicle, the position of the LOS vehicle, an ID of the first vehicle, or a position of the first vehicle. The apparatus further includes means for receiving, from the base station, resource allocation information based on the LOS vehicle information; and means for transmitting, based on the resource allocation information, a message indicating positioning information of the first vehicle. The apparatus further includes means for transmitting, to a second vehicle, a second ranging signal indicating an identifier (ID) of the first vehicle. The apparatus further includes means for receiving, from the LOS vehicle, a first message indicating a speed of the LOS vehicle; means for determining a Doppler shift between the first vehicle and the LOS vehicle based on the speed of the LOS vehicle and a speed of the first vehicle; means for receiving, from the LOS vehicle, a second message; and decoding the second message based on the Doppler shift. The apparatus further includes means for receiving LOS vehicle information indicating a second vehicle is along a LOS communication path of the first vehicle and a position of the second vehicle; means for receiving, from the second vehicle, a second ranging signal; and means for updating the position of the second vehicle based on the second ranging signal.

Embodiments of the present disclosure further include an apparatus comprising means for receiving, from a first vehicle, line-of-sight (LOS) vehicle information associated with the first vehicle and a second vehicle positioned along a LOS communication path of the first vehicle; means for allocating resources to the first vehicle and the second vehicle based on the LOS vehicle information; and means for transmitting resource allocation information based on the allocating.

The apparatus further includes wherein the LOS vehicle information includes at least one of an identifier (ID) of the first vehicle, an ID of the second vehicle, a position of the first vehicle, and a position of the second vehicle. The apparatus further includes wherein the means for allocating is further configured to allocate a first resource of the resources to the first vehicle; and allocate a second resource of the resources to the second vehicle, wherein the first resource and the second resource are different.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a sensor of a first vehicle, sensor data indicating a line-of-sight (LOS) vehicle;
receiving, by a wireless communication device of the first vehicle, one or more ranging signals from one or more other vehicles;
identifying, by the first vehicle, a first ranging signal transmitted by the LOS vehicle from among the one or more ranging signals based on the sensor data and an identifier (ID) of the LOS vehicle;
determining, by the first vehicle, a propagation time associated with the identified first ranging signal; and
determining, by the first vehicle, a position of the LOS vehicle based on at least the sensor data, the propagation time associated with the first ranging signal, and the ID of the LOS vehicle.

2. The method of claim 1, further comprising determining the position of the LOS vehicle by:
determining a relative position of the LOS vehicle with respect to the first vehicle based on the sensor data; and
determining the position of the LOS vehicle based on global positioning system (GPS) coordinate data of the first vehicle and the relative position.

3. The method of claim 2, further comprising:
determining the position of the LOS vehicle by determining a relative distance between the first vehicle and the LOS vehicle based on the first ranging signal; and
updating the position of the LOS vehicle based on the relative distance.

4. The method of claim 1, further comprising:
receiving, by the first vehicle from a second vehicle, a message indicating a position of the second vehicle and an ID of the second vehicle;
determining, by the first vehicle, that the second vehicle corresponds to the LOS vehicle based on the position of the LOS vehicle and the position of the second vehicle; and
associating the ID of the second vehicle with the LOS vehicle, the ID of the LOS vehicle corresponding to the ID of the second vehicle based on the association.

5. The method of claim 4, further comprising:
obtaining, from the first ranging signal, an ID of a transmitting vehicle that transmitted the first ranging signal; and
determining that the first ranging signal of the one or more ranging signals is transmitted by the LOS vehicle by determining that the ID of the LOS vehicle matches the ID of the transmitting vehicle.

6. The method of claim 4, further comprising broadcasting, by the first vehicle, LOS vehicle information indicating that the LOS vehicle is along a LOS communication path of the first vehicle, wherein the LOS vehicle information includes at least one of the ID of the LOS vehicle, the position of the LOS vehicle, an ID of the first vehicle, or a position of the first vehicle.

7. The method of claim 4, further comprising transmitting, by the first vehicle to a base station, LOS vehicle information indicating that the LOS vehicle is along a LOS communication path of the first vehicle, wherein the LOS vehicle information includes at least one of the ID of the LOS vehicle, the position of the LOS vehicle, an ID of the first vehicle, or a position of the first vehicle.

8. The method of claim 7, further comprising:
receiving, by the first vehicle from the base station, resource allocation information based on the LOS vehicle information; and
transmitting, by the first vehicle based on the resource allocation information, a message indicating positioning information of the first vehicle.

9. The method of claim 1, further comprising transmitting, by the first vehicle to a second vehicle, a second ranging signal indicating an identifier (ID) of the first vehicle.

10. The method of claim 1, further comprising:
receiving, by the first vehicle from the LOS vehicle, a first message indicating a speed of the LOS vehicle;
determining, by the first vehicle, a Doppler shift between the first vehicle and the LOS vehicle based on the speed of the LOS vehicle and a speed of the first vehicle;
receiving, by the first vehicle from the LOS vehicle, a second message; and
decoding, by the first vehicle, the second message based on the Doppler shift.

11. The method of claim 1, further comprising:
receiving, by the first vehicle, LOS vehicle information indicating a second vehicle is along a LOS communication path of the first vehicle and a position of the second vehicle;
receiving, by the first vehicle from the second vehicle, a second ranging signal; and
updating, by the first vehicle, the position of the second vehicle based on the second ranging signal.

12. The method of claim 1, wherein the sensor is at least one of a front-facing camera or a rear-facing camera.

13. A method of wireless communication, comprising:
receiving, by a base station from a first vehicle, line-of-sight (LOS) vehicle information including an LOS association between the first vehicle and a second vehicle based on a LOS communication path between the first vehicle and the second vehicle;
allocating, by the base station, resources to the first vehicle and the second vehicle based on the LOS association between the first vehicle and the second vehicle in the LOS vehicle information; and
transmitting, by the base station, resource allocation information based on the allocating.

14. The method of claim 13, wherein the LOS vehicle information includes at least one of an identifier (ID) of the first vehicle, an ID of the second vehicle, a position of the first vehicle, and a position of the second vehicle.

15. The method of claim 14, further comprising allocating the resources by:
allocating a first resource of the resources to the first vehicle; and
allocating a second resource of the resources to the second vehicle, wherein the first resource and the second resource are different.

16. An apparatus associated with a first vehicle, comprising:
a sensor configured to receive sensor data indicating a line-of-sight (LOS) vehicle;
a wireless communication device configured to receive one or more ranging signals from one or more other vehicles; and
a processor configured to:
identify a first ranging signal transmitted by the LOS vehicle from among the one or more ranging signals based on the sensor data and an identifier (ID) of the LOS vehicle;
determine a propagation time associated with the identified first ranging signal; and
determine a position of the LOS vehicle based on at least the sensor data, the propagation time associated with the first ranging signal, and the ID of the LOS vehicle.

17. The apparatus of claim 16, wherein the processor is further configured to determine the position of the LOS vehicle by:
determining a relative position of the LOS vehicle with respect to the first vehicle based on the sensor data; and
determining the position of the LOS vehicle based on global positioning system (GPS) coordinate data of the first vehicle and the relative position.

18. The apparatus of claim 17, wherein the processor is further configured to:
determine the position of the LOS vehicle by determining a relative distance between the first vehicle and the LOS vehicle based on the first ranging signal; and
update the position of the LOS vehicle based on the relative distance.

19. The apparatus of claim 16, wherein the wireless communication device is further configured to receive, from a second vehicle, a message indicating a position of the second vehicle and an ID of the second vehicle, and wherein the processor is further configured to:
determine that the second vehicle corresponds to the LOS vehicle based on the position of the LOS vehicle and the position of the second vehicle; and
associating the ID of the second vehicle with the LOS vehicle, the ID of the LOS vehicle corresponding to the ID of the second vehicle based on the association.

20. The apparatus of claim 19, wherein the first ranging signal indicates an ID of a transmitting vehicle that transmitted the first ranging signal, and wherein the processor is further configured to determine that the first ranging signal of the one or more ranging signals is transmitted by the LOS vehicle further by determining that the ID of the LOS vehicle matches the ID of the transmitting vehicle.

21. The apparatus of claim 19, wherein the wireless communication device is further configured to broadcast LOS vehicle information indicating that the LOS vehicle is along a LOS communication path of the first vehicle, and wherein the LOS vehicle information includes at least one of the ID of the LOS vehicle, the position of the LOS vehicle, an ID of the first vehicle, or a position of the first vehicle.

22. The apparatus of claim 19, wherein the wireless communication device is further configured to transmit, to a base station, LOS vehicle information indicating that the LOS vehicle is along a LOS communication path of the first vehicle, and wherein the LOS vehicle information includes at least one of the ID of the LOS vehicle, the position of the LOS vehicle, an ID of the first vehicle, or a position of the first vehicle.

23. The apparatus of claim 22, wherein the wireless communication device is further configured to:
  receive, from the base station, resource allocation information based on the LOS vehicle information; and
  transmit, based on the resource allocation information, a message indicating positioning information of the first vehicle.

24. The apparatus of claim 16, wherein the wireless communication device is further configured to transmit, to a second vehicle, a second ranging signal indicating an identifier (ID) of the first vehicle.

25. The apparatus of claim 16, wherein the wireless communication device is further configured to:
  receive, from the LOS vehicle, a first message indicating a speed of the LOS vehicle;
  determine a Doppler shift between the first vehicle and the LOS vehicle based on the speed of the LOS vehicle and a speed of the first vehicle;
  receive, from the LOS vehicle, a second message; and
  decode the second message based on the Doppler shift.

26. The apparatus of claim 16, wherein the wireless communication device is further configured to:
  receive LOS vehicle information indicating a second vehicle is along a LOS communication path of the first vehicle and a position of the second vehicle; and
  receive, from the second vehicle, a second ranging signal, and
  wherein the processor is further configured to update the position of the second vehicle based on the second ranging signal.

27. The apparatus of claim 16, wherein the sensor is at least one of a front-facing camera or a rear-facing camera.

28. A wireless communication device, comprising:
  a receiver configured to receive, from a first vehicle, line-of-sight (LOS) vehicle information including an LOS association between the first vehicle and a second vehicle based on a LOS communication path between the first vehicle and the second vehicle;
  a processor configured to allocate resources to the first vehicle and the second vehicle based on the LOS association between the first vehicle and the second vehicle in the LOS vehicle information; and
  a transmitter configured to transmit resource allocation information based on the allocated resources.

29. The wireless communication device of claim 28, wherein the LOS vehicle information includes at least one of an identifier (ID) of the first vehicle, an ID of the second vehicle, a position of the first vehicle, and a position of the second vehicle.

30. The wireless communication device of claim 29, wherein the processor is further configured to allocate the resources to the first vehicle and the second vehicle by:
  allocating a first resource of the resources to the first vehicle; and
  allocating a second resource of the resources to the second vehicle, wherein the first resource and the second resource are different.

* * * * *